Nov. 11, 1952 W. S. ERWIN 2,617,856

SELF-COMPENSATED PLATE CURRENT OSCILLATOR

Filed Oct. 16, 1946

Inventor
Wesley S. Erwin
By Attorneys
Spencer, Willits, Helwig & Baillio

Patented Nov. 11, 1952

2,617,856

UNITED STATES PATENT OFFICE 2,617,856

SELF-COMPENSATED PLATE CURRENT OSCILLATOR

Wesley S. Erwin, Detroit, Mich., assignor to General Motors Corporation, Detroit, Mich., a corporation of Delaware Application October 16, 1946, Serial No. 703,678

6 Claims. (Cl. 175—183)

The present invention relates to electronic oscillators and more particularly to oscillators that are tunable over a range of frequencies and are used to drive an electrical or electro-mechanical load.

More specifically this invention relates to a means for compensating no-load plate current variations as an oscillator is tuned over a frequency range.

It is well known in the radio art that a parallel tuned circuit at resonant frequency has a resistive impedance in ohms equal to $L/RC$. In this equation, L is the inductance of the circuit in henries, C is the capacitance of the condenser in the circuit in farads, and R is the ohmic resistance of the circuit in ohms. Thus, as the value of either C or L is varied to tune the resonant plate circuit of an oscillator over a range of frequencies, the resistive impedance of the plate circuit is varied with a resulting change in the plate current. If the value of R is changed as a result of resistance reflected from the load, this will also result in a change of plate current. This latter change in plate current is very useful in determining the impedance of a load coupled to the oscillator.

In order to determine the amount of change in plate current attributable to the loading of the plate circuit, some means of adjustment must be available to compensate for that change in plate current caused by the tuning of the circuit. In the prior art, it has been the practice to record the no-load plate current at the frequency under consideration and subtract this plate current from the actual plate current of the loaded oscillator in order to determine the change in current resulting from the load. In order to use this method of compensation it is necessary to utilize a plate current meter having a considerable current range with resulting low sensitivity. If the load to be measured is small so as to cause only a minute change in plate current, it is apparent that the inaccuracies of the prior art measuring methods are such as to make them useless.

It is therefore an object of the present invention to provide an oscillator with means for the compensation of no-load plate current.

It is a further object of the present invention to provide an automatic means for compensation of no-load plate current as an oscillator is tuned throughout its frequency band.

It is a further object of the present invention to provide an auxiliary circuit to produce across a meter a voltage equal and opposite to the voltage produced across the same meter by the no-load plate current of the oscillator so that the current through the meter is only that current resulting from loading of the plate circuit of the oscillator by a load coupled thereto.

Other objects will become apparent upon reading the specification and inspection of the figures of the drawing and will be specifically pointed out in the claims.

Referring to the drawing.

Figure 1:
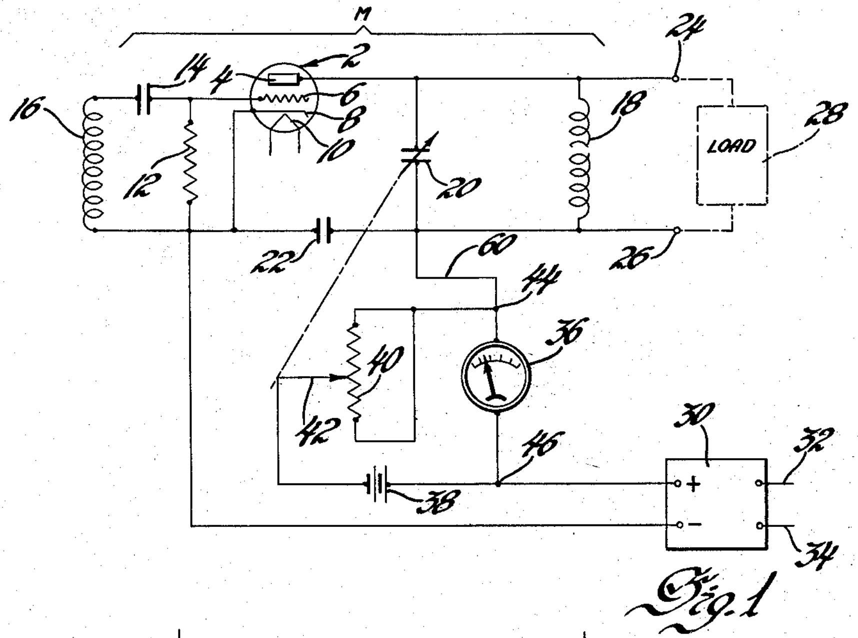
Figure 1 is a circuit diagram of the invention.

Referring more specifically to Figure 1, 2 is an electronic tube here illustrated as a triode having a plate 4, a control grid 6, an indirectly heated cathode 8 and a heater 10. A triode is used for simplicity of illustration only and any other suitable oscillation generator may be substituted therefor without departing from the scope of this invention.

The grid circuit of the tube includes bias resistor 12, coupling condenser 14 and inductance 16. The plate circuit of the oscillator includes an inductance 18 which is coupled to inductance 16 in such a phase as to feed back energy and maintain a status of oscillation throughout the frequency range. Variable condenser 20 is connected in parallel with inductance 18 to produce a resonant circuit which is tunable through a large frequency range. Condenser 22 is a condenser to permit the passage of alternating current and to block D. C. potential from the cathode. The load to be driven, the magnitude of which it is desired to measure, may be coupled to the terminals 24 and 26. This load is shown in schematic form as 28 and may be either an electrical or electro-mechanical load. In one specific use of this invention this load is a transducer of the piezoelectric crystal type. 30 is here schematically shown as a D. C. power supply receiving energy from lines 32 and 34. This power supply forms no part of the present invention and is shown for the sake of completeness only. It is, however, necessary that this power supply be of the constant potential type so that no variation in potential at the D. C. output terminal results from the normal current requirement fluctuations. 36 is a highly sensitive current meter. This meter, in the normal operation of this device, has no current flowing therethrough under no-load conditions. 38 is an auxiliary constant voltage source of D. C. potential. It is very necessary that the terminal voltage of this source of potential remain constant under different current requirements. 40 is a non-uniformly wound resistor or any suitable resistor having a resistance which varies in the desired manner as will be pointed out later in the specification. 42 is the potentiometer arm cooperating with this resistor and is rigidly coupled to the tuning plates of the condenser 20. If it is desired to use permeability tuning of this oscillator, this arm 42 would be coupled to the movable core of the permeability tuned circuit.

Figure 2:
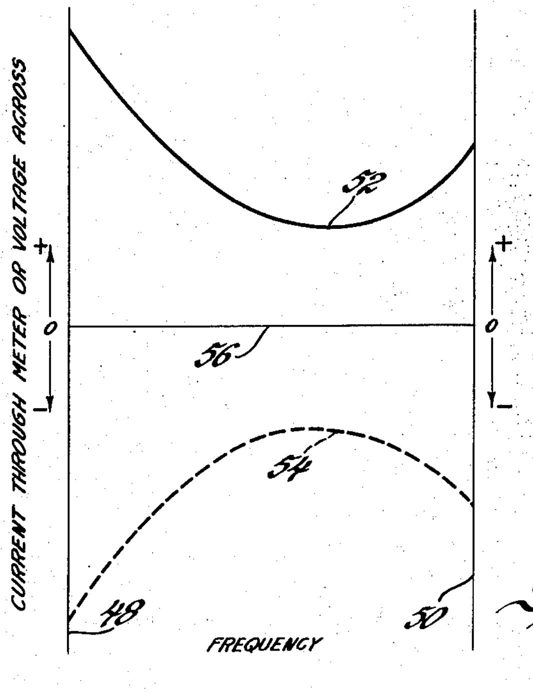
Figure 2 is the current-frequency relationship of the invention.

Referring more specifically to Figure 2, the frequency-current relationships of this invention are illustrated. The frequency range of the device varies from a low frequency of 48 to the high frequency of 50. As the device is tuned over this frequency band 52 is the magnitude of the normal no-load current and 54 is the magnitude of the compensating current developed by potential source 38 and its associated circuit. The resulting no-load current through the meter 36 is the algebraic sum of the normal no-load plate current and the compensating current or zero. This zero meter current is illustrated as 56. The operation of this device is as follows:

The oscillator generates a signal the wave length of which is determined by the resonant frequency of the plate circuit. Depending on the impedance of this circuit and other characteristics of the system a certain no-load plate current is caused to flow through the conductor 60 from the power supply 30. This current will vary with the impedance of the plate circuit and therefore vary as the oscillator is tuned over its frequency range. It is desirable that the no-load current through the meter 36 be of minimum value and preferably zero in order that a meter of high sensitivity and low range be used. In order to compensate for or counteract the current normally flowing through the meter 36 the auxiliary circuit including the resistor 40 and the source of potential 38 is introduced. The potential introduced at the terminals 44 and 46 by this auxiliary source of voltage is equal and opposite polarity to that voltage produced at these terminals by the no-load plate current. To get perfect cancellation it is therefore necessary that the resistor 40 be of the required configuration to generate the necessary potential across terminals 44 and 46 as the contact 42 is moved in unison with the tuning element of the plate circuit. If the elements 38, 40 and 42 are all tailor-made to the correct values the meter 36 will have zero current flowing through it at all frequencies when under no-load condition. After the adjustments are made for the no-load conditions, the load, here shown as 28, is coupled to the plate circuit. The meter is not compensated for plate current resulting from the change of impedance in the plate circuit caused by the load. For this reason the meter will now read the change in plate current resulting from load only. From the above description of the apparatus and its method of operation it will be seen that the meter 36 measures only the load current and therefore it may have a quite small current range with high resulting sensitivity.

It is to be understood also that although the invention has been described with specific reference to a particular embodiment thereof, it is not to be so limited, since changes and alterations therein may be made which are within the full intended scope of this invention as defined by the appended claims.

I claim:

1. In an electronic oscillator the resonant frequency of which may be varied, a direct current source of plate potential for said oscillator, a tunable plate circuit in said oscillator for varying the resonant frequency of said oscillator, a meter connected in said plate circuit responsive to plate current, a second source of potential connected in parallel with said meter, and automatic coupling means for varying said second source simultaneously with said resonant frequency whereby said meter is compensated for changes in plate current resulting from varying said resonant frequency.

2. An electronic oscillator for driving an electrical load including, a plate circuit tunable over a frequency band by a variable condenser, a source of plate potential in said plate circuit, a direct current measuring device in said plate circuit, and an automatic compensating circuit for said measuring device, including a second source of potential connected in parallel with said measuring device and in opposite polarity to said source of plate potential and means for varying said second source of potential simultaneously with said variable condenser whereby said measuring device is compensated for changes in current resulting from change in oscillator resonant frequency as said plate circuit is tuned.

3. In an electronic oscillator having a tunable plate circuit, a variable electrical reactance element for adjusting the resonant frequency of said plate circuit, a source of plate potential for said oscillator, a self compensated circuit in said plate circuit including a second source of potential and means for varying said second source of potential simultaneously with said reactance element to thereby compensate for variations in plate current normally resulting from the change in plate circuit impedance caused by said tuning.

4. In an electronic oscillator having a tunable plate circuit, means for varying the resonant frequency of said plate circuit, a source of plate potential for said oscillator, and a self compensated circuit in said plate circuit, including a second source of potential, a variable resistor for varying the voltage output of said second source of potential, and an operative connection between said variable resistor and said means for varying the resonant frequency to thereby cause variations in said voltage output as said plate circuit is tuned whereby the variation in plate current normally resulting from said tuning is minimized.

5. In an electronic oscillator having a tunable plate circuit, a variable electrical reactance element for adjusting the resonant frequency of said plate circuit, a source of plate potential for said oscillator, and a self compensated circuit in said plate circuit, including a second source of potential, a variable resistor for varying said second source of potential, and an operative connection between said variable resistor and said variable reactance adapted to cause simultaneous variations in said second source of potential as said reactance is varied to thereby compensate for variations in plate current normally resulting from the change in plate circuit impedance as said reactance element is varied.

6. In an electronic oscillator having a tunable plate circuit, means for adjusting the resonant frequency of said plate circuit, a source of plate potential for said oscillator, and automatic compensating means in said plate circuit, including a variable secondary source of potential, and means coupling said variable secondary source to said frequency adjusting means thereby causing variations in said secondary source as said plate circuit is tuned to compensate for variations in plate current normally resulting from said tuning.

WESLEY S. ERWIN.

REFERENCES CITED

The following references are of record in the file of this patent:

UNITED STATES PATENTS

| Number | Name | Date |
|---|---|---|
| 1,898,432 | Edwards et al. | Feb. 21, 1933 |
| 2,222,221 | Burford | Nov. 19, 1940 |
| 2,243,524 | Deal et al. | May 27, 1941 |
| 2,255,727 | Allison | Sept. 9, 1941 |
| 2,262,149 | Slonczewski | Nov. 11, 1941 |
| 2,281,205 | Schock | Apr. 28, 1942 |
| 2,293,227 | Tubbs | Aug. 18, 1942 |
| 2,326,344 | Elmendorf et al. | Aug. 10, 1943 |
| 2,337,759 | Loughlin | Dec. 28, 1943 |

OTHER REFERENCES

Vacuum Tube Voltmeters, Rider, October 1945, 11th printing, John F. Rider Publisher, Inc., pages 55 and 56.